(12) United States Patent
Masuko

(10) Patent No.: US 8,898,135 B2
(45) Date of Patent: Nov. 25, 2014

(54) INFORMATION PROCESSING DEVICE, INFORMATION PROCESSING METHOD, INFORMATION PROCESSING METHOD, INFORMATION PROCESSING PROGRAM AND RECORDING MEDIUM

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 20 days.

(21) Appl. No.: 13/700,477

(22) PCT Filed: May 30, 2011

(86) PCT No.: PCT/JP2011/062338
§ 371 (c)(1),
(2), (4) Date: Nov. 28, 2012

(87) PCT Pub. No.: WO2011/149103
PCT Pub. Date: Dec. 1, 2011

(65) Prior Publication Data
US 2013/0091127 A1 Apr. 11, 2013

(30) Foreign Application Priority Data
May 28, 2010 (JP) .................................. 2010-123192

(51) Int. Cl.
G06F 17/30 (2006.01)
(52) U.S. Cl.
CPC .... *G06F 17/30864* (2013.01); *G06F 17/30991* (2013.01)
USPC .......................................... 707/706; 707/798
(58) Field of Classification Search
CPC ......................... G06K 9/62555; G06F 17/3099
USPC ................... 707/705, 706, 707; 715/382, 800
See application file for complete search history.

(56) References Cited

U.S. PATENT DOCUMENTS

| | | | | |
|---|---|---|---|---|
| 5,034,893 A * | 7/1991 | Fisher | ............................... | 701/99 |
| 7,106,909 B2 * | 9/2006 | Satoh et al. | .................... | 382/239 |
| 7,164,955 B2 * | 1/2007 | Moreas et al. | ................... | 700/59 |
| 7,222,306 B2 * | 5/2007 | Kaasila et al. | ................. | 715/801 |
| 2002/0152222 A1 * | 10/2002 | Holbrook | ................... | 707/104.1 |
| 2003/0118240 A1 * | 6/2003 | Satoh et al. | .................... | 382/239 |
| 2009/0311680 A1 * | 12/2009 | Nakao et al. | ....................... | 435/6 |
| 2011/0311680 A1 * | 12/2011 | Takase et al. | ................... | 426/51 |
| 2013/0066847 A1 * | 3/2013 | Morard | .......................... | 707/706 |

FOREIGN PATENT DOCUMENTS

| | | |
|---|---|---|
| JP | 10-011463 A | 1/1998 |
| JP | 2007-265060 A | 10/2007 |
| JP | 2008-090567 A | 4/2008 |
| JP | 2010-108378 A | 5/2010 |

OTHER PUBLICATIONS

Japanese Patent Office Action dated Sep. 4, 2012 for corresponding application JP 2012-517353 and English-language translation thereof.

* cited by examiner

*Primary Examiner* — Baoquoc N To
(74) *Attorney, Agent, or Firm* — Sughrue Mion, PLLC

(57) ABSTRACT

Search keywords are acquired (S3), a first item and a second item displayable by scale axes are set in accordance with the search keywords (S4, S5), a search is made by the search keywords and the scale axis values of the items and a presence of search hits is found (S5), and display data for displaying a 2D distribution of the presence of search hits is generated by the scale axis values of the items in a plane with two axes including the scale axis of the first item and the scale axis of the second item (S11).

4 Claims, 13 Drawing Sheets

| SEARCH KEYWORD | ITEM 1 | ITEM 2 | ITEM 3 | ITEM 4 | ITEM 5 |
|---|---|---|---|---|---|
| VEHICLE | GENERATION | PRICE | TYPE OF VEHICLE | COLOR | ××× |
| BUILDING | GENERATION | PRICE | ... | ... | ... |
| CELL PHONE | GENERATION | AGE | PRICE | ... | ... |
| ... | ... | ... | ... | ... | ... |

12t

| ITEM | SCALE AXIS DISPLAYABLE | SCALE RANGE AND OTHERS | INCREMENT |
|---|---|---|---|
| GENERATION (VEHICLE) | 1 | 1960 TO 2011 | ONE YEAR |
| PRICE (VEHICLE) | 1 | 0 YEN TO 10,000,000 YEN | LESS THAN 1,000,000 YEN: 100,000 YEN<br>1,000,000 YEN OR MORE: 1,000,000 YEN |
| TYPE OF VEHICLE | 0 | F TYPE, · · · | |
| COLOR (VEHICLE) | 0 | GREEN, RED, WHITE, BLACK, · · · | |
| x x x | 1 | · · · | · · · |
| · · · | · · · | · · · | · · · |

FIG.4

INFORMATION PROCESSING DEVICE, INFORMATION PROCESSING METHOD, INFORMATION PROCESSING METHOD, INFORMATION PROCESSING PROGRAM AND RECORDING MEDIUM

CROSS REFERENCE TO RELATED APPLICATIONS

This application is a National Stage of International Application No. PCT/JP2011/062338 filed May 30, 2011, claiming priority based on Japanese Patent Application No. 2010-123192 filed May 28, 2010, the contents of all of which are incorporated herein by reference in their entirety.

TECHNICAL FIELD

The present invention relates to a technical field of an information processing device for processing information for search, an information processing method, an information processing program and a recording medium.

BACKGROUND ART

In recent years, a search technique in Internet is enhanced, and not only sentences but also images or animations are searched. For example, Patent Document 1 discloses therein an information search device capable of determining a search range based on metadata associated with information (file) such as images and specifying a granularity of the search range based on a unit of numerical information contained in a query when searching a file from a database. More specifically, for a query for specifying the search range, a first number and a keyword are input to specify an annual or monthly granularity of the first number, thereby obtaining a second number of a granularity corresponding to the keyword, and a file contained in the search range determined by the first and second numbers is searched from a plurality of files.

CITATION LIST

Patent Document

Patent Document 1: Japanese Patent Application Laid-Open No. 2010-108378

SUMMARY OF THE INVENTION

Problem to be Solved by the Invention

However, with the above technique, when an image or the like is searched, zero search result may be present depending on an input keyword or the number of keywords, and the searching needs to be repeated by further inputting other keyword.

The present invention has been made in terms of the above problem, and its object is to provide an information processing device for enabling a user to efficiently make a search when searching information via Internet or the like, an information processing method, an information processing program and a recording medium.

Means for Solving the Problem

In order to solve the above problem, according to an aspect of an exemplary embodiment, an information processing device includes a search keyword acquiring means that acquires search keywords; an item setting means that sets a first item and a second item displayable by scale axes in accordance with the search keywords; a search hitting means that makes a search by the search keywords and scale axis values of the items, and finds a presence of search hits; and a display data generating means that generates display data for displaying a 2D distribution of the presence of search hits on a Web page in accordance with the scale axis values of the items in a plane with two axes including the scale axis of the first item and the scale axis of the second item.

According to another exemplary embodiment, the item setting means sets a third item in accordance with the search keywords, the search hitting means finds a presence of search hits in accordance with the scale axis value of the first item, the scale axis value of the second item and contents of the third item, and the display data generating means generates display data for segmenting and displaying a 2D distribution of the presence of search hits in accordance with the third item.

According to another exemplary embodiment, the information processing device further includes scale axis value acquiring means that acquires the scale axis values of the first item and the second item; and a searching means that makes a search by the scale axis values of the first item and the second item in a region set in accordance with the scale axis values, and the search keywords in the plane, wherein the display data generating means generates display data for displaying search results by the searching means on a Web page.

According to another exemplary embodiment, the scale axis value acquiring means acquires two scale axis values of the first item and acquires two scale axis values of the second item for the two scale axis values in order to acquire four points in the plane, and the searching means makes a search by the scale axis values of the first item and the second item in a region defined by the four points set by the acquired scale axis values, and the search keywords.

According to another exemplary embodiment, the item setting means changes and sets the items to other items displayable by the scale axes, and the search hitting means makes a search by the search keywords and the scale axis values of the changed items, and finds a presence of search hits. p According to another exemplary embodiment, the search hitting means makes a search by the search keywords and the scale axis values of the items, and finds the number of search hits, and the display data generating means generates display data for displaying a 2D distribution of the numbers of search hits on a Web page in accordance with the scale axis values of the items.

According to another aspect of an exemplary embodiment, an information processing method of processing information in an information processing device includes a search keyword acquiring step of acquiring search keywords; an item setting step of setting a first item and a second item displayable by scale axes in accordance with the search keywords; a search hitting step of making a search by the search keywords and the scale axis values of the items, and finding a presence of search hits; and a display data generating step of generating display data for displaying a 2D distribution of the presence of search hits on a Web page in accordance with the scale axis values of the items in a plane with two scale axes including the scale axis of the first item and the scale axis of the second item.

According to an aspect of an exemplary embodiment, the information processing method of processing information in an information processing device causes a computer to function as: a search keyword acquiring means that acquires search keywords; an item setting means that sets a first item and a second item displayable by scale axes in accordance with the search keywords; a search hitting means that makes a search by the search keywords and scale axis values of the items, and finds a presence of search hits; and a display data generating means that generates accordance with the scale axis values of the items in a plane with two axes including the scale axis of the first item and the scale axis of the second item.

According to an aspect of an exemplary embodiment, an information processing program causes a computer to function as a search keyword acquiring means that acquires search keywords; an item setting means that sets a first item and a second item displayable by scale axes in accordance with the search keywords; a search hitting means that makes a search by the search keywords and scale axis values of the items, and finds a presence of search hits; and a display data generating means that generates display data for displaying a 2D distribution of the presence of search hits on a Web page in accordance with the scale axis values of the items in a plane with two axes including the scale axis of the first item and the scale axis of the second item.

Effect of the Invention

According to the present invention, by setting the first item and the second item displayable by the scale axes in accordance with the acquired search keywords, making a search is made by the search keywords and the scale axis values of the items to find a presence of search hits, and generating the display data for displaying the 2D distribution of the presence of search hits on a Web page in accordance with the scale axis values of the items in the plane with two axes including the scale axis of the first item and the scale axis of the second item, when the user designates search keywords, the items in accordance with the search keywords are set and the presence of search hits is two-dimensionally displayed in accordance with the scale axis values of the items, so that when searching information over Internet or the like, the user can narrow the searching while viewing the presence of search hits in accordance with the scale axis values of the items, thereby efficiently making a search.

BRIEF DESCRIPTION OF THE DRAWINGS

FIG. 4 is a schematic view illustrating an example of a data structure of the item database of FIG. 2.

MODES FOR CARRYING OUT THE INVENTION

An embodiment according to the present invention will be described below using the drawings.

[1. Outline of Configuration and Function of Information Processing System]

First, an outline of an information processing system according to one embodiment of the present invention will be described using FIG. 1.

Figure 1:
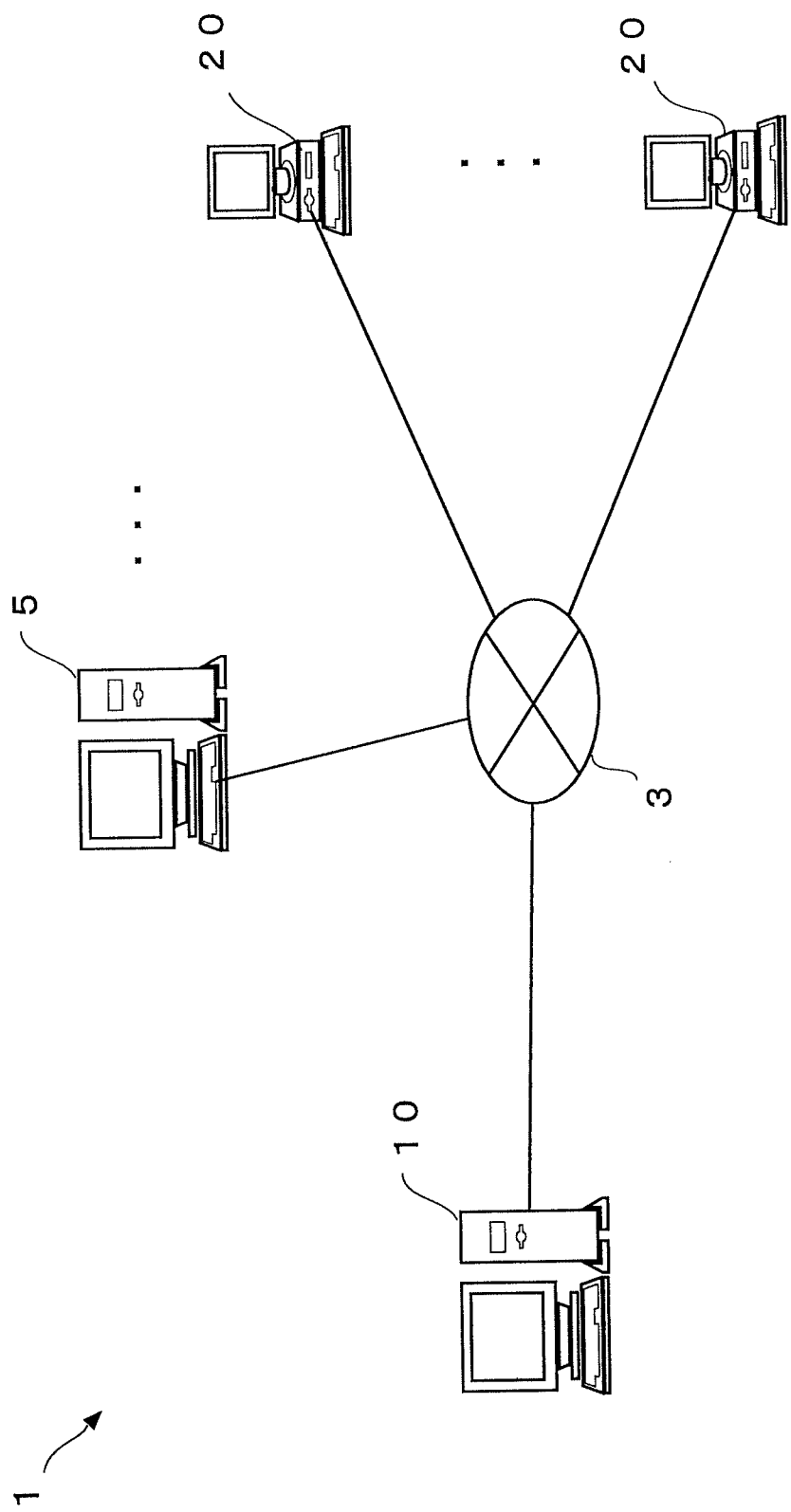
FIG. 1 is a schematic view illustrating an example of a schematic configuration of an information processing system according to one embodiment of the present invention.

FIG. 1 is a schematic view illustrating an example of a schematic configuration of the information processing system 1 according to the present embodiment.

As illustrated in FIG. 1, the information processing system 1 includes an information processing server (an example of a information processing device) 10 that analyzes information of a website 5 or the like in order to support user search, and a user terminal 20 that operates searching to browse search results.

The information processing server 10, the terminal 20 and the website 5 are connected to each other via a network 3, and a communication protocol such as TCP/IP is used to enable data to be mutually exchanged. In addition, the network 3 is constructed by, for example, Internet, a dedicated communication line (such as CATV (Community Antenna Television) line), a mobile communication network (including, for example, base stations), a gateway and the like. In addition to the website 5, a target analyzing information may be a website such as shopping site managed by a shopping server (not illustrated) connected to the information processing server 10 via a local area network or the like.

[2. Configuration and Function of Server]
(2.1 Configuration and Function of Information Processing Server 10)

Next, a configuration and a function of the information processing server 10 will be described using FIGS. 2 to 4.

Figure 2:
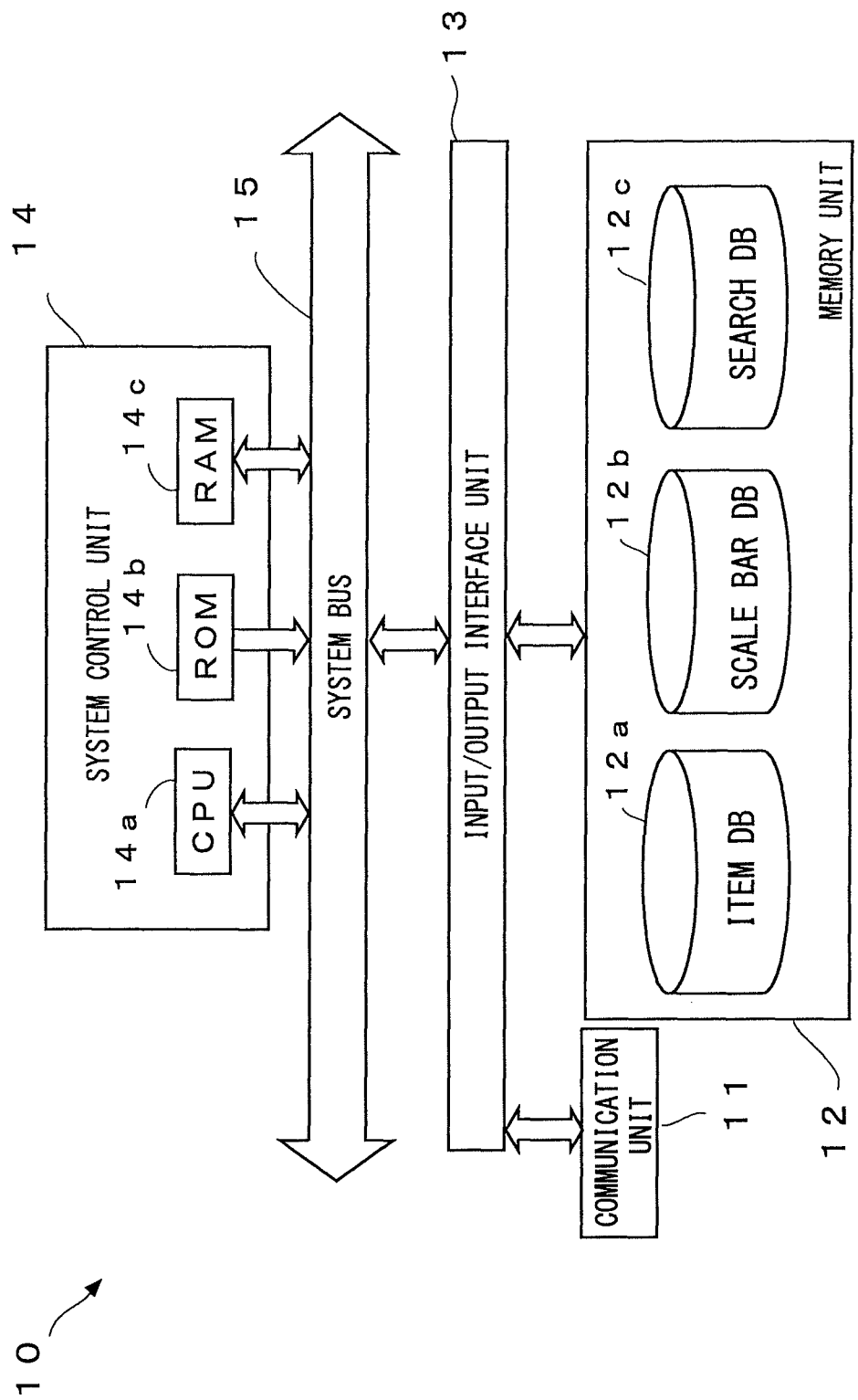
FIG. 2 is a block diagram illustrating an example of an outline of an information processing server of FIG. 1.

FIG. 2 is a block diagram illustrating an example of an outline of the information processing server 10. FIG. 3 and FIG. 4 are schematic views illustrating an example of a data structure of an item database.

As illustrated in FIG. 2, the information processing server 10 functioning as a computer includes a communication unit 11, a memory unit 12, an I/O interface unit 13 and a system control unit 14. Then, the system control unit 14 and the I/O interface unit 13 are connected to each other via a system bus 15.

The communication unit 11 is connected to the network 3 to control a communication state with the website 5 or the terminal 20, and is further connected to a local area network to exchange data with a server on the local area network.

The memory unit 12 is configured of a hard disk drive or the like, for example, and stores therein various programs such as operating system, server programs, and programs downloaded into and executed by the terminal 20 or the like, and data. In addition, various programs may be acquired via the network 3 from other server device or the like, for example, or may be recorded in a recording medium and read via a drive device.

The memory unit 12 includes an item database (which will be denoted as "item DB" below) 12a that stores items for setting items displayable by scale axes in accordance with search keywords received from the terminal 20, a scale bar database (which will be denoted as "scale bar DB" below) 12b that stores information on user-operable scale bars in order to display an analysis result with the items as scale axes, and a search database (which will be denoted as "search DB" below) 12c that stores information necessary for searching webs.

Figure 3:
FIG. 3 is a schematic view illustrating an example of a data structure of an item database of FIG. 2.

The item DB 12a includes a table in which the search keywords are associated with a plurality of items, respectively, as illustrated in FIG. 3. For example, for a search keyword of "vehicle", "generation", "price", "type of vehicle", "color of vehicle" and "xxx" are previously assigned to item 1, item 2, item 3, item 4 and item 5, respectively. For a search keyword of "building", "generation" and "price" are previously assigned to item 1 and item 2, respectively. For a search keyword of "cell phone", "generation" of the cell phone, "age" when the cell phone is purchased, and "price" of the cell phone are previously assigned to item 1, item 2 and item 3, respectively.

Further, the item DB 12a includes a table as to whether each item is displayable by a scale axis as illustrated in FIG. 4. "1" is assigned to the items developed on the scale axes. In addition, for each search keyword, "generation" and "price" may be preset as item defaults. A range of item displayable by the scale axis and an increment of the item are stored. For example, for the item "generation", a scale range is set between the item maximum value (1960) and the minimum value (2011) and the increment is set at "1 year."

In addition, the item range may be set from the maximum value or minimum value of each item, or previously set. For example, the range to be displayed may be "1970 to 2010." Data on the item increment may be data on price range for the item of price. For example, " . . . , 100,000 yen to 190,000 yen, 200,000 to 290,000, 300,000 to 390,000, . . . " may be employed.

Herein, an item displayable by the scale axis is a developable item on one axis in ascending order of values such as " . . . , 2000, 2001, 2002" for the item "generation" or " . . . , 100,000 yen, 110,000 yen, 120,000 yen, . . . " for the item "price." On the other hand, when the items developed on the scale axes are the items "color of vehicle" and "type of vehicle" assigned with "0", the items cannot be developed on one axis in ascending order of values.

The scale bar DB 12b stores information on scale bars for designating an analysis result of a search target by the scale axis values of the items. For example, the scale bar DB 12b stores image data on scale bars or knobs to be displayed on the display unit 23 in the terminal 20.

The search DB 12c stores index information, snippets, and the like generated by an indexer from data acquired from the website 5 or the like. The search DB 12c may be a database for searching a secondhand market of vehicles or houses, or a database for searching a purchase history of products such as cell phone.

Next, the I/O interface unit 13 is for an interface processing between the communication unit 11, the memory unit 12 and the system control unit 14.

The system control unit 14 is configured of a CPU (Central Processing Unit) 14a, a ROM (Read Only Memory) 14b, a RAM (Random Access Memory) 14c and the like. The CPU 14a reads and executes various programs stored in the ROM 14b or the memory unit 12 so that the system control unit 14 transmits a Web page in response to a request from the terminal 20 or the like.

(2.2 Configuration and Function of Terminal 20)

Next, a configuration and a function of the terminal 20 will be described using FIG. 5.

FIG. 3 is a block diagram illustrating an example of a schematic configuration of the terminal 20.

Figure 5:
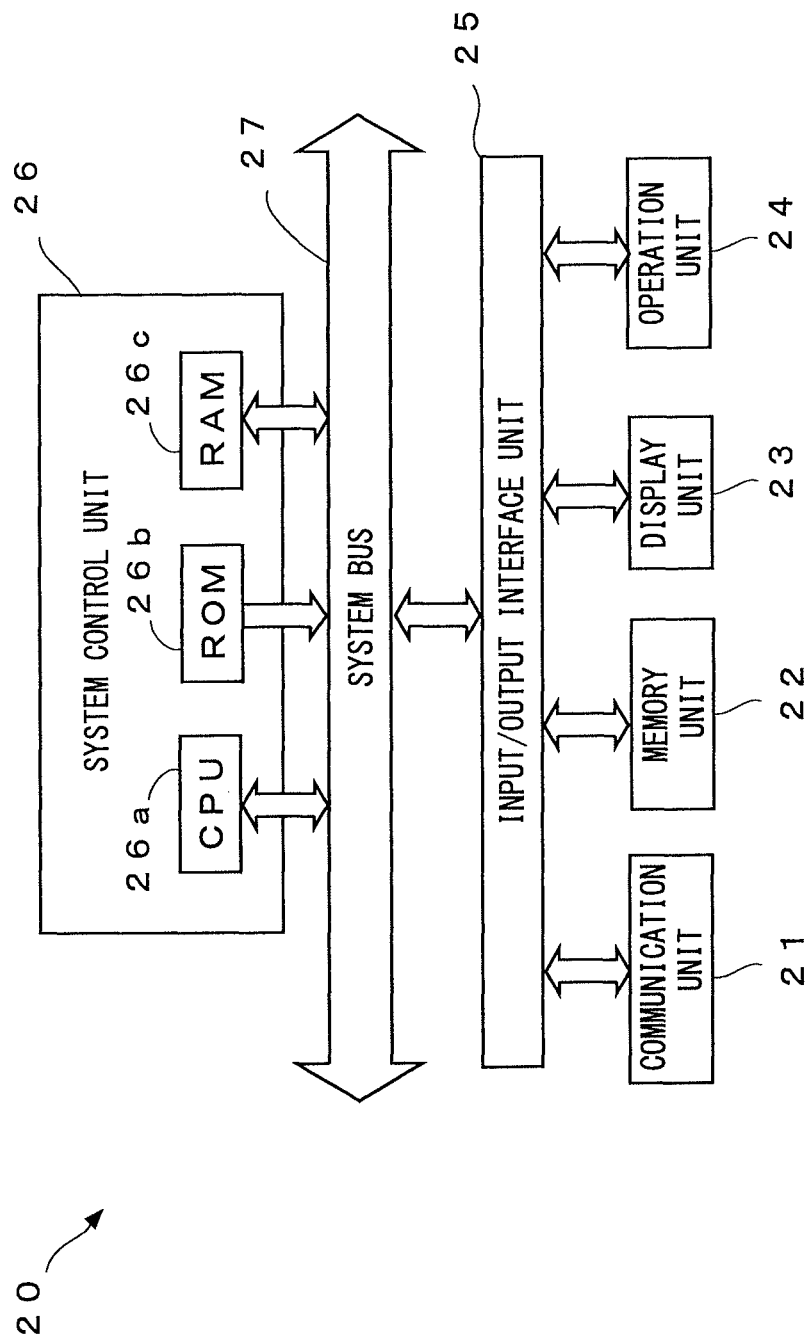
FIG. 5 is a block diagram illustrating an example of a schematic configuration of a terminal of FIG. 1.

As illustrated in FIG. 5, the terminal 20 functioning as a computer is a portable terminal such as personal computer, portable wireless phone (cell phone) or PDA, and includes a communication unit 21, a memory unit 22, a display unit 23, an operation unit 24, an I/O interface unit 25, and a system control unit 26. The system control unit 26 and the I/O interface unit 25 are connected to each other via a system bus 27.

The communication unit 21 controls communication with the information processing server 10 or the like via the network 3. In addition, when the terminal 20 is a portable wireless phone, the communication unit 21 has a wireless communication function in order to connect to a mobile communication network of the network 3.

The memory unit 22 is configured of a hard disk drive or the like, for example, and stores an operating system, a Web browser program and the like.

The display unit 23 is configured of a liquid crystal display device, an EL (Electro Luminescence) device or the like, for example. The display unit 23 displays thereon a pointer moving in response to a mouse operation, a Web page of search results acquired from the information processing server 10, and the like.

The operation unit 24 is configured of a keyboard, a mouse, and the like, for example. The scale bars displayed on the display unit 23 are operated by the operation unit 24.

The I/O interface unit 25 is an interface between the communication unit 21, the memory unit 22 and the system control unit 26.

[3. Operations Of Information Processing System]

Next, the operations of the information processing system 1 according to the present embodiment will be described using the drawings.

(3.1 Operations of Information Processing System)

At first, an operation of creating a searchable region displaying the number of search hits in accordance with the scale axis values of the items will be described as an operation of the information processing system using FIG. 6 to FIG. 8.

Figure 6:
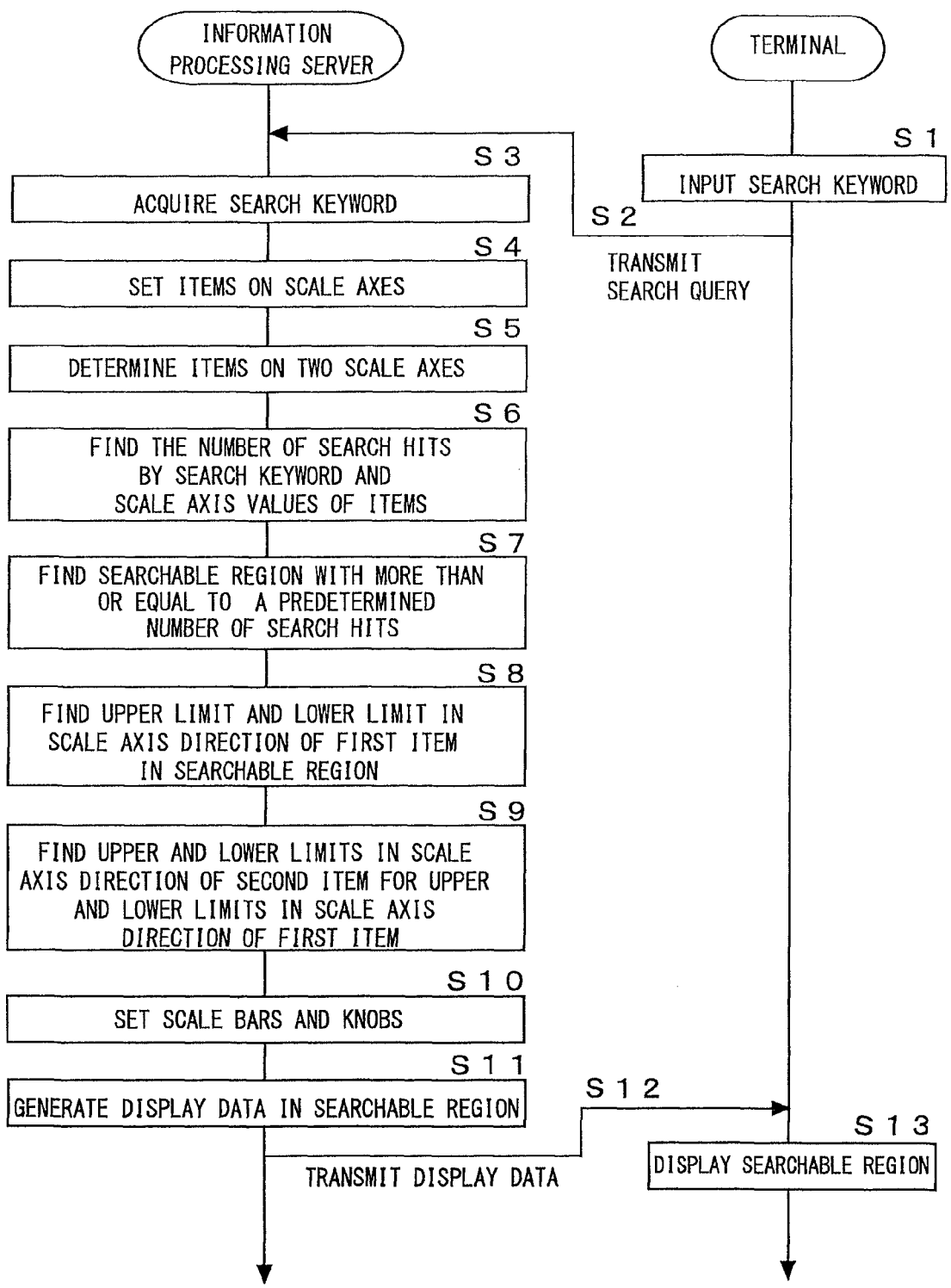
FIG. 6 is a sequence diagram illustrating example of operations of the information processing system of FIG. 1.

FIG. 6 is a sequence diagram illustrating example of operations of the information processing system 1. FIG. 7 and FIG. 8 are schematic views illustrating an example of a window screen displayed on the terminal 20.

As illustrated in FIG. 6, the terminal 20 receives input search keywords (step S1). More specifically, the system control unit 26 in the terminal 20 receives search keywords (such as "vehicle" or "used vehicle") of a target which the user wants to search via the operation unit 24. In addition, an automobile manufacturer name or the like may be employed instead of "vehicle."

Next, the terminal 20 transmits a search query (step S2). More specifically, the system control unit 26 in the terminal 20 creates a search query by the search keywords and transmits it to the information processing server 10.

Next, the information processing server 10 acquires the search keywords (step S3). More specifically, the system control unit 14 in the information processing server 10 acquires the search query from the terminal 20 and extracts the search keywords from the search query. In this way, the system control unit 14 in the information processing server 10 functions as an example of a search keyword acquiring means for acquiring search keywords.

Next, the information processing server 10 sets a plurality of items of the scale axes (step S4). More specifically, the system control unit 14 in the information processing server 10 sets items in accordance with the acquired search keywords with reference to a table 12t in the item DB 12a. For example, when the search keyword is "vehicle" or "used vehicle", the system control unit 14 in the information processing server 10 acquires the items "generation", "price", "type of vehicle", "color" and "xxx." In this way, the system control unit 14 in the information processing server 10 functions as an example of an item setting means for setting items displayable by the scale axes in accordance with the search keywords.

Next, the information processing server 10 determines the items on two scale axes (step S5). More specifically, the system control unit 14 in the information processing server 10 sets the first item "generation" displayable by the scale axis and the second item displayable by the scale axis with reference to a table 12s in the item DB 12a. The system control unit 14 in the information processing server 10 sets "type of vehicle" and "color" whose values displayable by the scale axes are "0" (not displayable by the scale axis) as exemplary third items in accordance with the search keywords. In this way, the system control unit 14 in the information processing server 10 functions as an item setting means for setting the first and second items displayable by the scale axes in accordance with the search keywords, and an item setting means for setting the third item in accordance with the search keywords by way of example.

Next, the information processing server 10 finds the number of search hits by the search keywords and the scale axis values of the items (step S6). More specifically, the system control unit 14 in the information processing server 10 makes a search by AND of a search keyword, each item and each scale value with reference to the search DB 12c, and finds the number of search hits. The system control unit 14 in the information processing server 10 finds the number of search hits by a search query containing "vehicle, 1960, 100,000 yen", for example. In addition, the scale axis value may be a price range or "vehicle, 1960, 100,000 yen to 190,000 yen." At this time, the system control unit 14 in the information processing server 10 has a search function capable of acquiring information that the price belongs to "100,000 yen to 190,000 yen."

The system control unit 14 in the information processing server 10 increases each scale axis value by a predetermined value from the minimum value of the range up to the maximum value with reference to the scale range value of the table 12s in the item DB 12a for the scale axis values of the first item ("generation") and the second item ("price"), thereby making a search. For example, the system control unit 14 in the information processing server 10 makes a search by "vehicle, 196, 110,000 yen" subsequent to "vehicle, 1960, 100,000 yen." In addition, the system control unit 14 in the information processing server 10 may make a search by "vehicle, 1960, 200,000 yen to 290,000 yen" subsequent to "vehicle, 1960, 100,000 yen to 190,000 yen" for the price range. A schedule range may be a user-designated range.

Next, the information processing server 10 finds a searchable region with more than or equal to a predetermined number of search hits (step S7). More specifically, the system control unit 14 in the information processing server 10 finds a set of the scale axis value of the first item and the scale axis value of the second item with more than or equal to a predetermined number of (such as zero or ten) search hits. The system control unit 14 in the information processing server 10 finds a searchable region indicated by the set of the scale axis value of the first item and the scale axis value of the second item (x=the scale axis value of the first item, y=the scale axis value of the second item) with more than or equal to a predetermined number of search hits assuming the scale axis of the first item as the x-axis direction and the scale axis of the second item as the y-axis direction in a plane with the two axes including the x-axis direction for the scale axis of the first item and the y-axis direction for the scale axis of the second item. For example, the system control unit 14 in the information processing server 10 finds a searchable region 40 as illustrated in FIG. 7.

In addition, in step S6 and step S7, the system control unit 14 in the information processing server 10 may find a presence of search hits instead of finding the number of search hits. In this way, the system control unit 14 in the information processing server 10 functions as an example of a search hitting means for making a search by the search keywords and the scale axis values of the items and finding the number of search hits. The system control unit 14 in the information processing server 10 functions as an example of a search hitting means for making a search by the search keywords and the scale axis values of the items and finding the number of search hits.

The system control unit 14 in the information processing server 10 finds a distribution of the numbers of search hits in the searchable region 40. For example, the system control unit 14 in the information processing server 10 finds a region 41 with zero search hit. Then, a region 42 and a region 43 in accordance with the number of search hits are found. In addition, the region 43 has a largest number of search hits. The system control unit 14 in the information processing server 10 increases the value of the first item (generation) by one year from the lower limit of 1973 up to the upper limit of 1998, and finds the maximum value of the number of search hits of the second item (price) in each date of the first item.

Next, the information processing server 10 finds the upper limit and the lower limit in the scale axis direction of the first item in the searchable region (step S8). More specifically, the system control unit 14 in the information processing server 10 finds the upper limit and the lower limit in the scale axis direction (the x-axis direction) of the first item in the searchable region. For example, the system control unit 14 in the information processing server 10 finds the upper limit (such as 1998) and the lower limit (such as 1973) of the date of a search-hit vehicle. In addition, the user may set the upper and lower limits.

Next, the information processing server 10 finds the upper and lower limits in the scale axis direction of the second item for the upper and lower limits in the scale axis direction of the first item (step S9). More specifically, the system control unit 14 in the information processing server 10 finds the upper and lower limits (such as 2,000,000 and 3,800,000) in the scale axis direction (the y-axis direction) of the second item for the upper limit in the scale axis direction of the first item, and finds the upper and lower limits (such as 100,000 and 1,000,000) in the scale axis direction (the y-axis direction) of the second item for the lower limit in the scale axis direction of the first item.

Next, the information processing server 10 sets scale bars and knobs (step S10). More specifically, the system control unit 14 in the information processing server 10 sets a scale bar 50 of the first item and knobs 60 as illustrated in FIG. 7. The knobs 60 are initially set at the upper limit and the lower limit in the scale axis direction of the first item, and near the middle of the upper and the lower limits on the scale bar 50. For example, in the searchable region 40, the upper limit in the scale axis direction of the first item (age) is "1998", the lower limit is "1973", the middle of the upper and lower limits is "1985", and the knobs 60 are initially set at "1973", "1985" and "1998" on the scale bar 50, respectively.

The system control unit 14 in the information processing server 10 then sets the scale bar 51 of the second item near the middle (such as "1985") of the upper and lower limits in the scale axis direction of the first item, sets the scale bar 52 of the second item at the lower limit (such as "1973") in the scale axis direction of the first item, and sets the scale bar 53 of the second item at the upper limit (such as "1998") in the scale axis direction of the first item. In addition, each scale bar 51, 52, 53 is set in a position to pass through the knob 60.

The knob 61 on the scale bar 51 is initially set at the upper limit (such as "4,000,000 yen") in the scale axis direction of the second item, and the knob 62 on the scale bar 51 is initially set at the lower limit (such as "300,000 yen") in the scale axis direction of the second item. The knob 61 on the scale bar 52 is initially set at the upper limit (such as 1,000,000 yen) in the scale axis direction of the second item for the lower limit in the scale axis direction of the first item, and the knob 62 on the scale bar 52 is initially set at the lower limit (such as 100,000 yen) in the scale axis direction of the second item for the lower limit in the scale axis direction of the first item. The knob 61 on the scale bar 53 is initially set at the upper limit (such as 3,800,000 yen) in the scale axis direction of the second item for the upper limit in the scale axis direction of the first item, and the knob 62 on the scale bar 53 is initially set at the lower limit (such as 2,000,000 yen) in the scale axis direction of the second item for the upper limit in the scale axis direction of the first item.

In addition, the user uses the operation unit 24 to move the knobs 61, 62 on the scale bars 51, 52, 53 thereby to designate the scale axis values indicated by the knobs on the scale bars 51, 52, 53. The user uses the operation unit 24 to move the knobs 60 so that the scale bar 51 of the second item, and the scale bars 51, 52 move in the scale axis direction of the first item.

Next, the information processing server 10 generates display data in the searchable region (step S11). More specifically, the system control unit 14 in the information processing server 10 generates display data for displaying the searchable region 40 such as the Web page 30, the scale bars 50, 51, 52, 53 and the knobs 60, 61, 62. In addition, the image data on the scale bars and the knobs is acquired from the scale bar DB 12b.

In this way, the system control unit 14 in the information processing server 10 functions as an example of a display data generating means that generates display data for displaying a 2D distribution of the numbers of search hits on a Web page in accordance with the scale axis values of the items in the plane with the two axes including the scale axis of the first item and the scale axis of the second item.

Next, the information processing server 10 transmits the display data (step S12). More specifically, the system control unit 14 in the information processing server 10 transmits the display data for displaying the Web page 30 on the terminal 20 to the terminal 20. In addition, the information processing server 10 transmits information on the maximum value of the number of search hits with the second item (price) in each age of the first item, the search keywords, the items and the like in addition to the display data.

Next, the terminal 20 displays the searchable region (step S13). More specifically, the system control unit 26 in the terminal 20 displays the display data received from the information processing server 10 on the display unit 23. For example, as illustrated in FIG. 7, the system control unit 26 in the terminal 20 displays the Web page 30 as the display data.

In addition, when the user moves the scale bar 51 of the second item in the scale axis direction of the first item (generation) by the operation unit 24, the mark "X" is displayed on the scale bar 51 at the position of the price with a largest number of search hits in the age indicated by the scale bar 51. In this case, the user can know the price with a large number of search hits in each generation.

Figure 7:
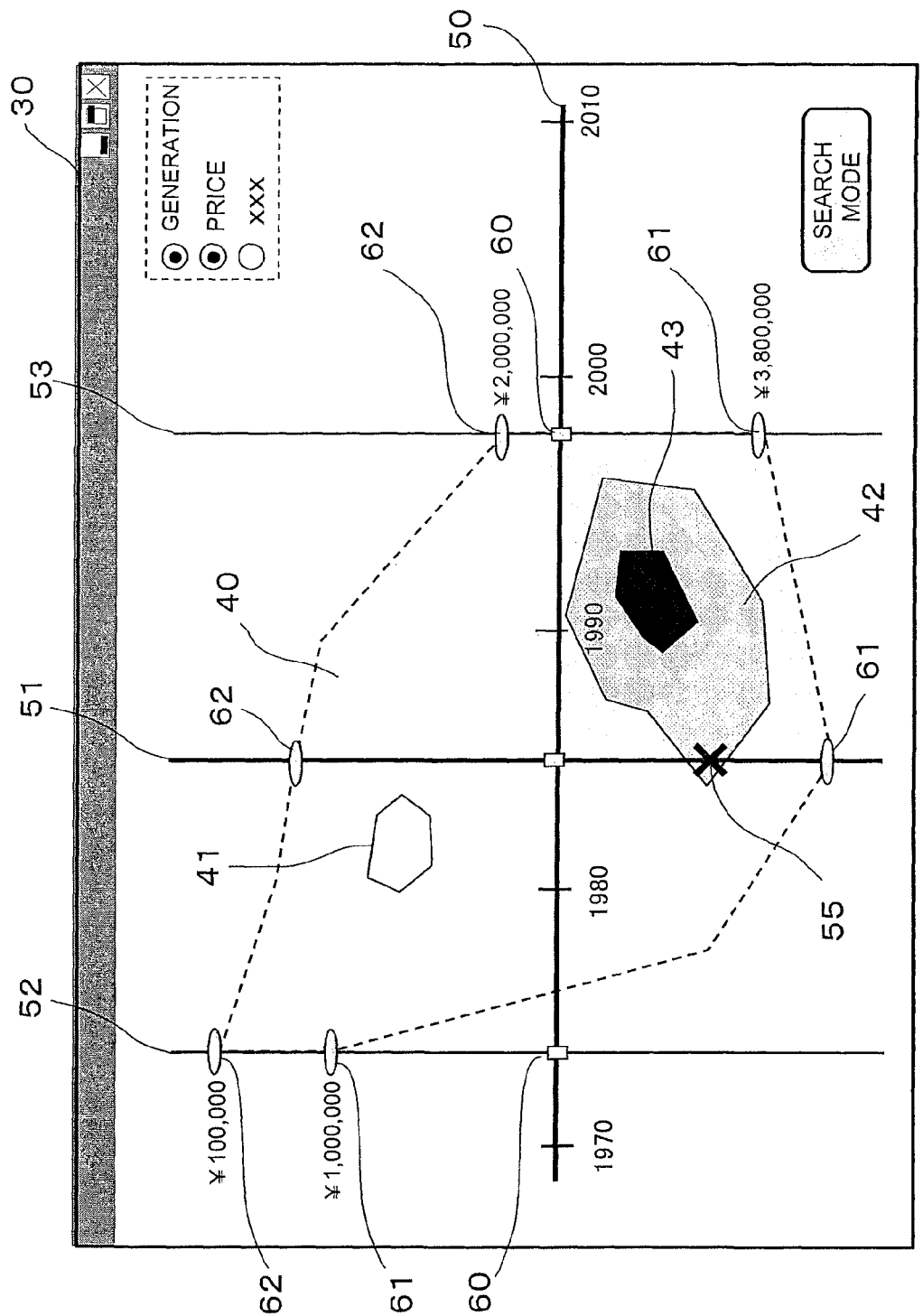
FIG. 7 is a schematic view illustrating an example of a window screen displayed on the terminal of FIG. 1.

As illustrated in FIG. 7, when the user designates a radio button for setting an item axis by the operation unit 24 thereby to select the items "age" and "xxx" displayable by the scale axes, for example, the system control unit 26 in the terminal 20 transmits the information on the selected items together with the same search keywords to the information processing server 10. The system control unit 14 in the information processing server 10 may set the items "generation" and "xxx" as two items displayable by the scale axes thereby to find a searchable region in step S5. In this way, the system control unit 14 in the information processing server 10 functions as an example of an item setting means for changing and setting an item to other item displayable by a scale axis. Further, it functions as an example of a search hitting means for making a search by a search keyword and a scale axis value of the changed item and finding a presence of a search hit.

Figure 8:
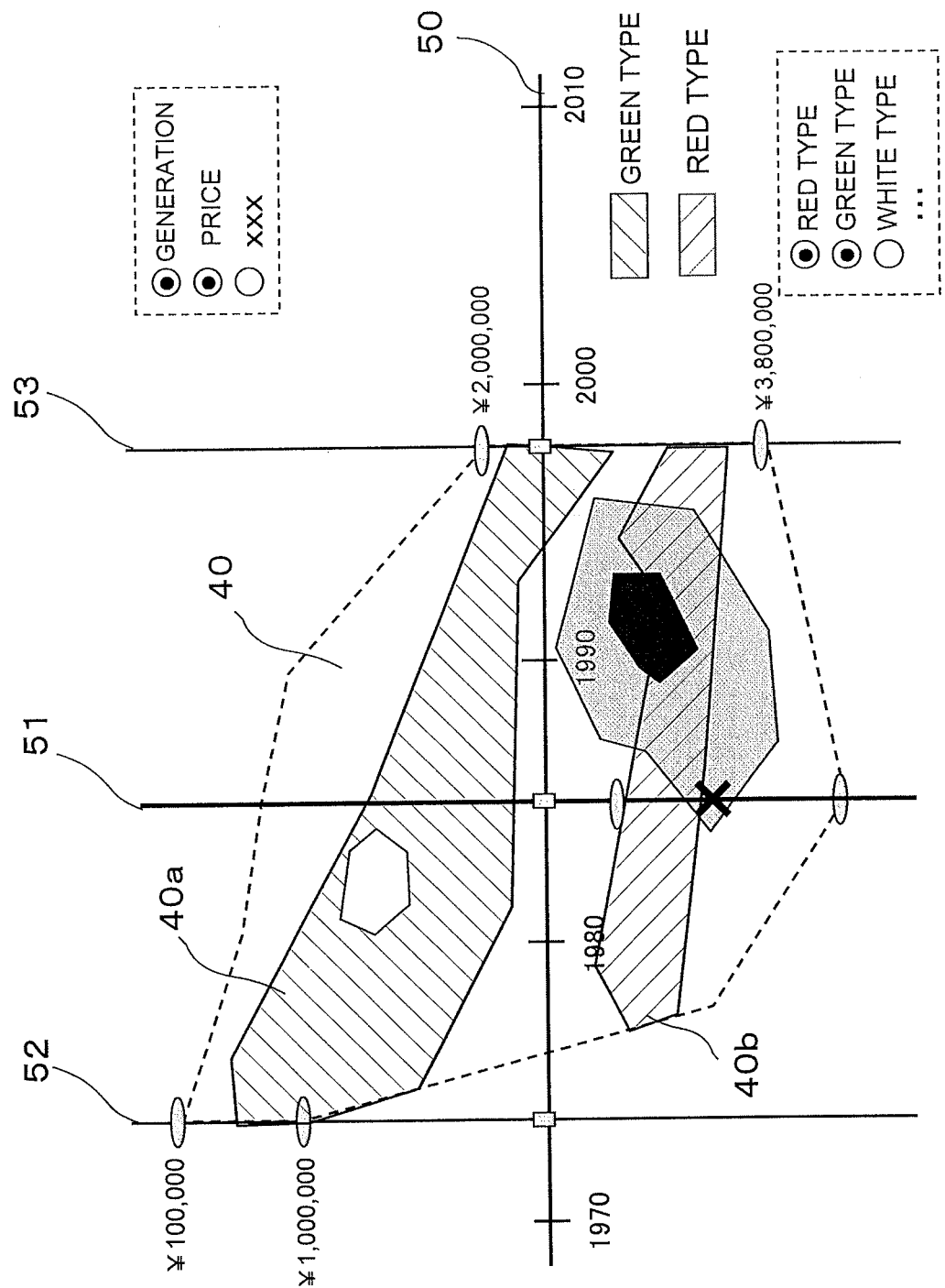
FIG. 8 is a schematic view illustrating an example of a window screen displayed on the terminal of FIG. 1.

In addition to the scale-displayable items, when the user designates a predetermined value of the item "color" as an exemplary third item by the operation unit 24, the display data segmenting the searchable region 40 is displayed in accordance with the value of the item "color" as illustrated in FIG. 8. In order to display such display data, in step S6, the system control unit 14 in the information processing server 10 makes a search by AND of a search keyword, each item, each scale value and "color of vehicle, green" when the color of vehicle is green, finds a presence of a search hit, and finds a region 40a. The system control unit 14 in the information processing server 10 makes a search by AND of a search keyword, each item, each scale value and "color of vehicle, red" when the color of vehicle is red, and finds a region 40b.

In this way, the system control unit 14 in the information processing server 10 functions as the item setting means for setting the third item in accordance with the search keyword, the search hitting means for finding a presence of a search hit in accordance with the scale axis value of the first item, the scale axis value of the second item and the contents of the third item, and the display data generating means for generating display data in order to segment and display a 2D distribution of search hits or the numbers of search hits in accordance with the third item by way of example.

(3.2 Search Operations)

Next, a sub-routine of the scale bar display will be described using FIG. 9 and FIG. 10.

Figure 9:
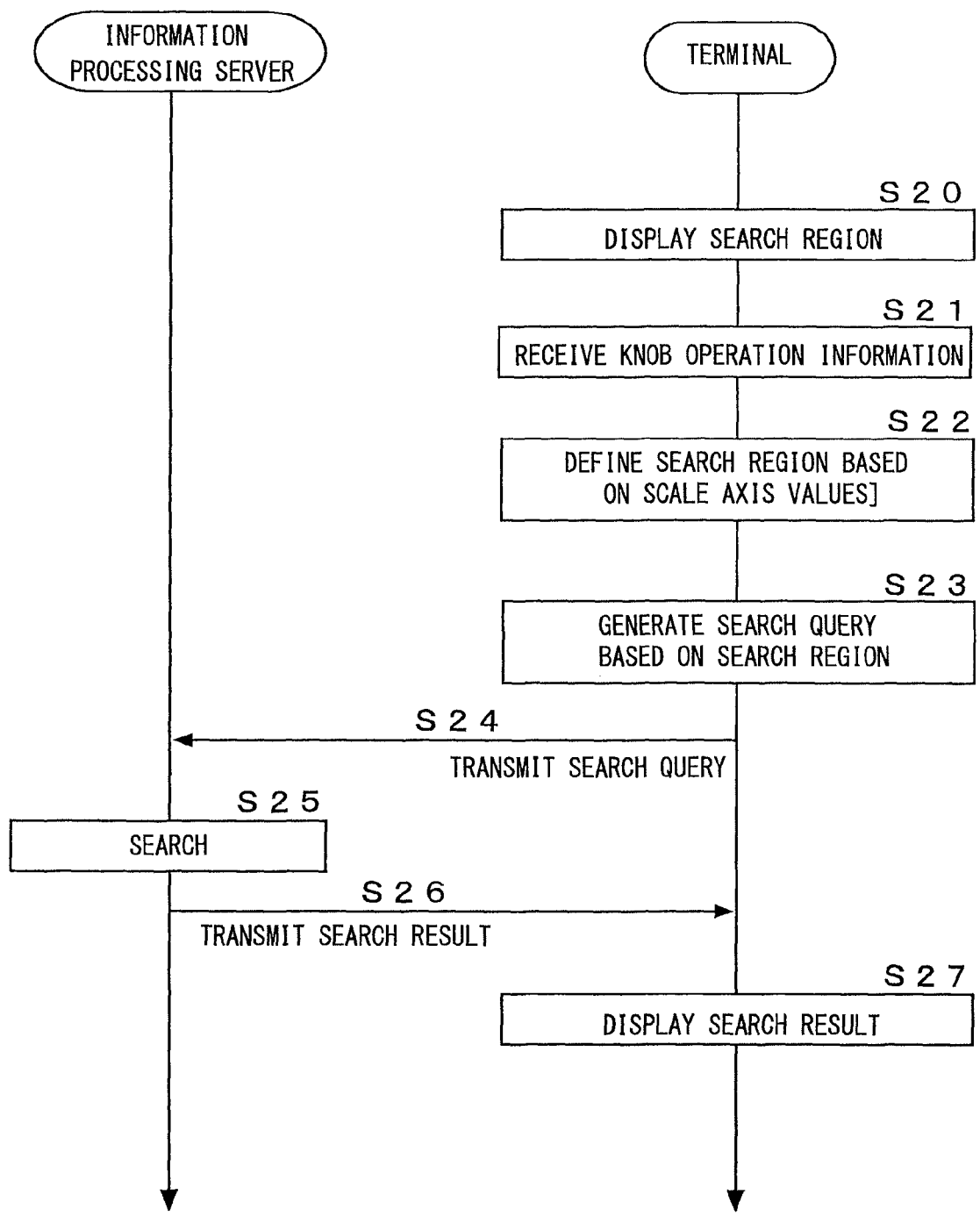
FIG. 9 is a sequence diagram illustrating example of search operations of the information processing system of FIG. 1.
Figure 10:
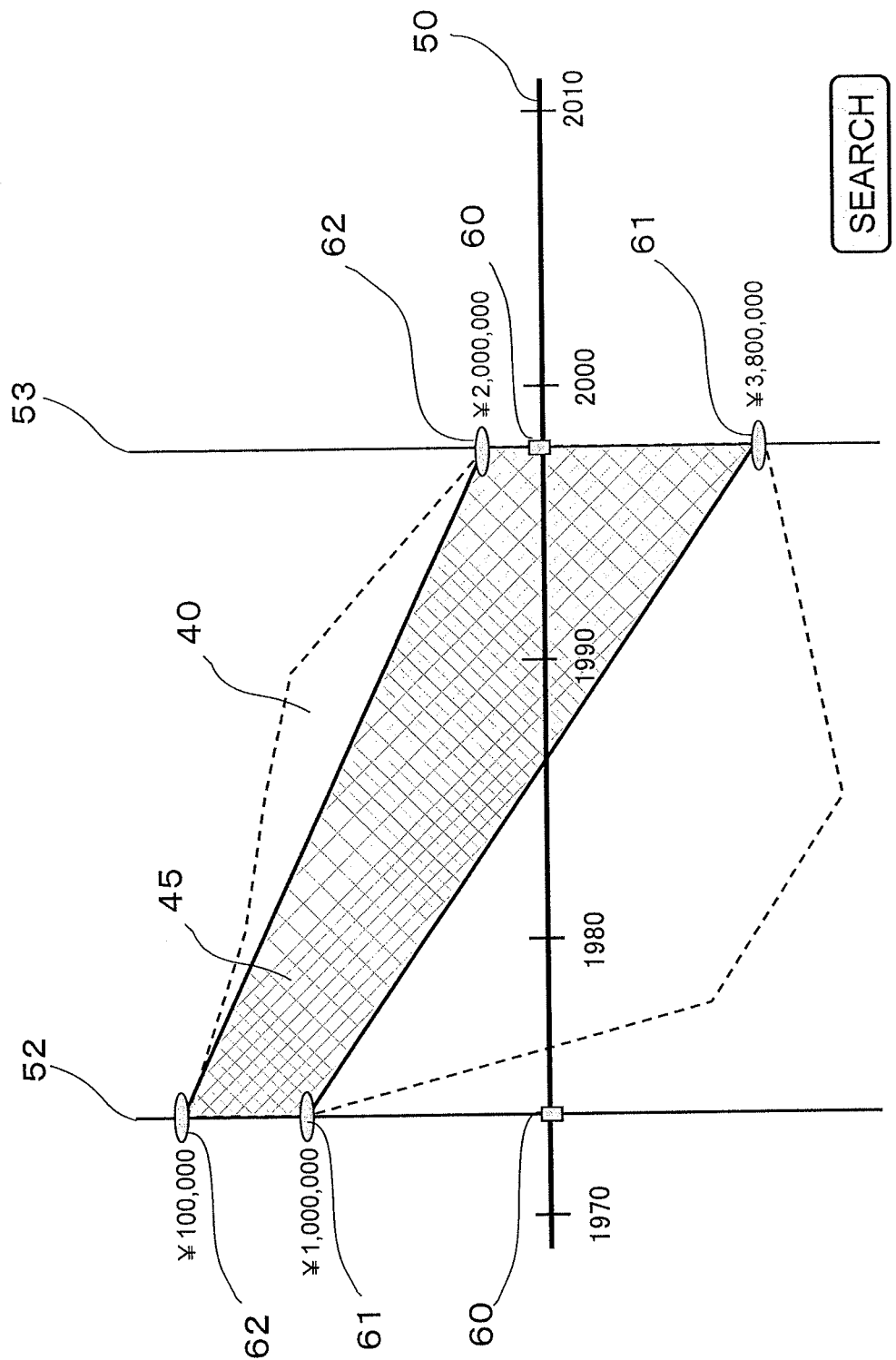
FIG. 10 is a schematic view illustrating an example of a search refinement window screen displayed on the terminal of FIG. 1.

FIG. 9 is a sequence diagram illustrating example of search operations in the information processing system 1. FIG. 10 is a schematic view illustrating an example of a search refinement window screen displayed on the terminal 20.

As illustrated in FIG. 9, the terminal 20 displays a search region (step S20). More specifically, when the search mode button illustrated in FIG. 7 is designated, the system control unit 26 in the terminal 20 displays, on the display unit 23, a search region 45 surrounded by the scale axis values indicated by the knob 61 and the knob 62 on the scale bar 52 for the lower limit in the scale axis direction of the first item, and the scale axis values indicated by the knob 61 and the knob 62 on the scale bar 53 for the upper limit in the scale axis direction of the first item (a total of four points) as illustrated in FIG. 10.

Next, the terminal 20 receives knob operation information (step S21). More specifically, the system control unit 26 in the terminal 20 receives, from the operation unit 24, the knob operation information that the user uses the operation unit 24 to move the knobs 60 and to move the scale bars 52, 53 or the user uses the operation unit 24 to move the knobs 61, 62.

Next, the terminal 20 defines the search region based on the scale axis values (step S22). More specifically, when the user uses the operation unit 24 to designate the search button, the system control unit 26 in the terminal 20 defines the search region 45 by the scale axis values indicated by the knobs 60, 61, 62.

Next, the terminal 20 generates a search query based on the search region (step S23). More specifically, the system control unit 26 in the terminal 20 generates a search query from the information on the search region 45 (the scale values indicated by the knobs 60, 61, 62) together with the information on the search keywords and the items received from the information processing server 10.

Next, the terminal 20 transmits the search query (step S24). More specifically, the system control unit 26 in the terminal 20 transmits the generated search query to the information processing server 10.

Next, the information processing server 10 makes a search (step S25). More specifically, the system control unit 14 in the information processing server 10 specifies a range of the scale axis values necessary for search from the search keywords in the received search query, the information on the items and the information on the search region 45, makes a search of each scale axis value in the search region 45 at a predetermined interval with reference to the search DB 12*c*, and acquires snippets or URL information as search results from the search DB 12*c*.

In this way, the system control unit 14 in the information processing server 10 functions as a scale axis value acquiring means for acquiring two scale axis values on the scale axis of the first item and acquiring two scale axis values on the scale axis of the second item for the two scale axis values in order to acquire four points on the plane, a searching means for making a search by the scale axis values of the first item and the second item in the region defined by the four points set by the acquired scale axis values, and the search keywords, and a display data generating means for generating display data for displaying search results of the searching on a Web page, by way of example.

Next, the information processing server 10 transmits the search results (step S26). More specifically, the system control unit 14 in the information processing server 10 transmits a list of search results to the terminal 20.

Next, the terminal 20 displays the search results (step S27). More specifically, the system control unit 26 in the terminal 20 displays the list of search results on the display unit 23.

As described above, according to the present embodiment, when the first item and the second item (such as generation and price) displayable by the scale axes are set in accordance with the acquired search keyword (such as vehicle), a search is made by the search keywords and the scale axis values of the items, the number of search hits (the presence of search hits) is found, and the display data for displaying a 2D distribution (the searchable region 40) of the numbers of search hits (the presence of search hits) on the Web page 30 is generated in accordance with the scale axis values of the items in the plane with the two axes including the scale axis of the first item and the scale axis of the second item so that the user designates search keywords, the items are set in accordance with the search keywords, the number of search hits (the presence of search hits) (the searchable region 40) in accordance with the scale axis values of the items is two-dimensionally displayed so that when searching information over Internet, the user can narrow the searching while viewing the number of search hits in accordance with the scale axis values of the items, thereby efficiently making a search.

When the information processing server 10 sets the third item in accordance with the search keyword, finds the number of search hits (the presence of search hits) in accordance with the scale axis value, the scale axis value of the second item and the contents of the third item, and generates the display data for segmenting and displaying a 2D distribution (the searchable region 40) of the numbers of search hits (the presence of search hits) in the regions 40*a*, 40*b* in accordance with the third item, the user can easily grasp the state of the number of search hits (the presence of search hits) by the third item because of the segmentation according to the information on the third item, thereby easily narrowing the searching.

When the information processing server 10 acquires the scale axis values of the first item and the second item, makes a search by the scale values of the first item and the second item in the region set in accordance with the scale axis values, and the search keywords in the plane, and generates the display data to be displayed on the Web page 30, the user can narrow the searching only by designating the values by the scale bars and the knobs.

When the information processing server 10 acquires two scale axis values on the scale axis of the first item and acquires two scale axis values on the scale axis of the second item for the two scale axis values in order to acquire four points on the plane, and makes a search by the scale axis values of the first item and the second item in the region defined by the four points set by the acquired scale axis values, and the search keywords, and generates the display data for displaying the search results on the Web page, the user can easily designate the searched search region 45 by the scale bars 50, 52, 53 and the knobs 60, 61, 62.

When the information processing server 10 changes and sets an item to other item displayable by a scale axis, makes a search by the search keyword and the scale axis value of the changed item, and finds the number of search hits (the presence of search hits), the user can easily find a search target because the searchable region is indicated by other item with a different viewpoint.

Figure 11:
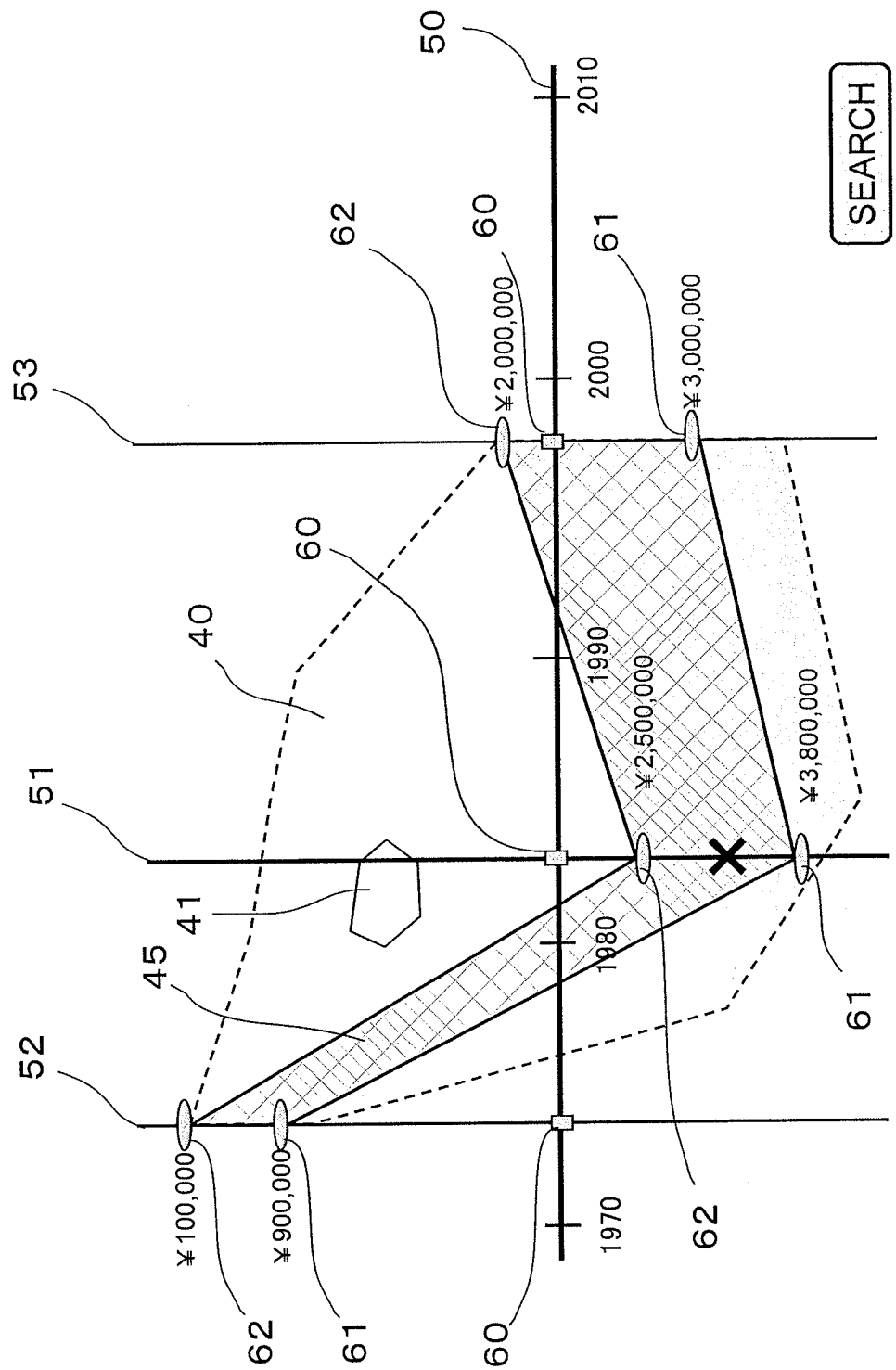
FIG. 11 is a schematic view illustrating an example of a search refinement window screen displayed on the terminal of FIG. 1.

In addition, as illustrated in FIG. 11, the search region 45 may be designated by the three scale bars 51, 52, 53 in order to easily narrow the searching. The user designates the search region 45 by the knobs 61, 62 on the scale bars 51, 52, 53 by the operation unit 24. For example, the user designates the search region 45 by moving the knob 61 on the scale bar 52 to "900,000 yen" and the knob 60 on the scale bar 51 to an older generation on the scale bar 50, and then to move the knob 61 and the knob 62 on the scale bar 51, and to move the knob 61 on the scale bar 53 to "3,000,000 yen" by the operation unit 24. In this case, the region 41 with zero search hit can be easily avoided. In addition, the number of scale bars of the second item is not limited to three, and may be more. The search region may be designated by the region surrounded by two scale bars of the first item and two scale bars of the second item.

Figure 12:
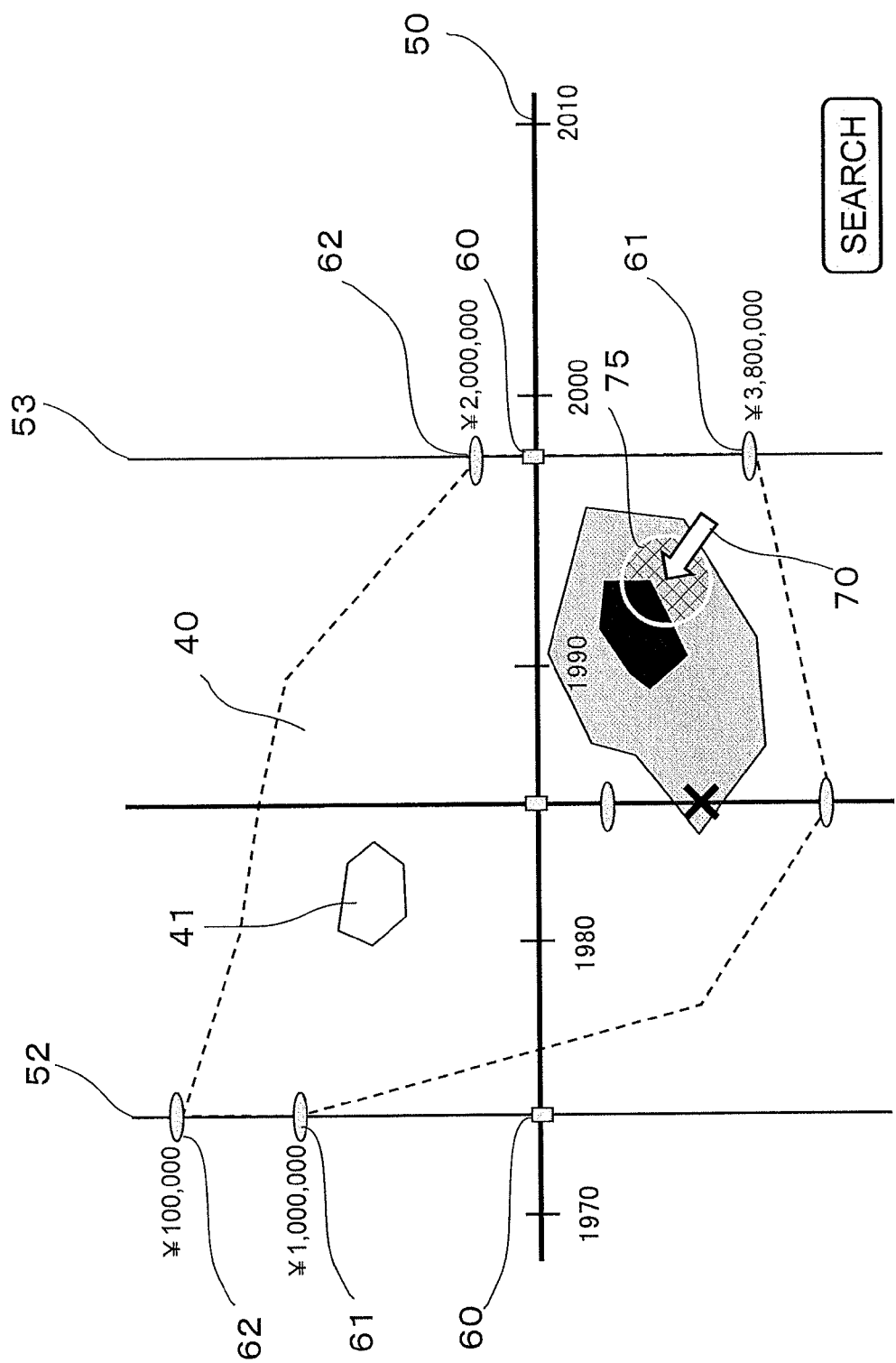
FIG. 12 is a schematic view illustrating an example of a search refinement window screen displayed on the terminal of FIG. 1.

As illustrated in FIG. 12, a predetermined search region 75 including a point designated by the pointer 70 by the user via the operation unit 24 may be designated in the searchable region 40. For example, when the searchable region 40 is indicated by the pointer 70 by the mouse of the operation unit 24, the circular search region 75 about the point indicated by the pointer 70 is displayed and the search region 75 may be defined when being clicked by the mouse. Only a set of the scale axis value of the first item and the scale axis value of the second item is specified from the coordinate of the point indicated by the pointer 70, and a set of the scale axis value of the first item and the scale axis value of the second item within the circular search region 75 is also specified.

Figure 13:
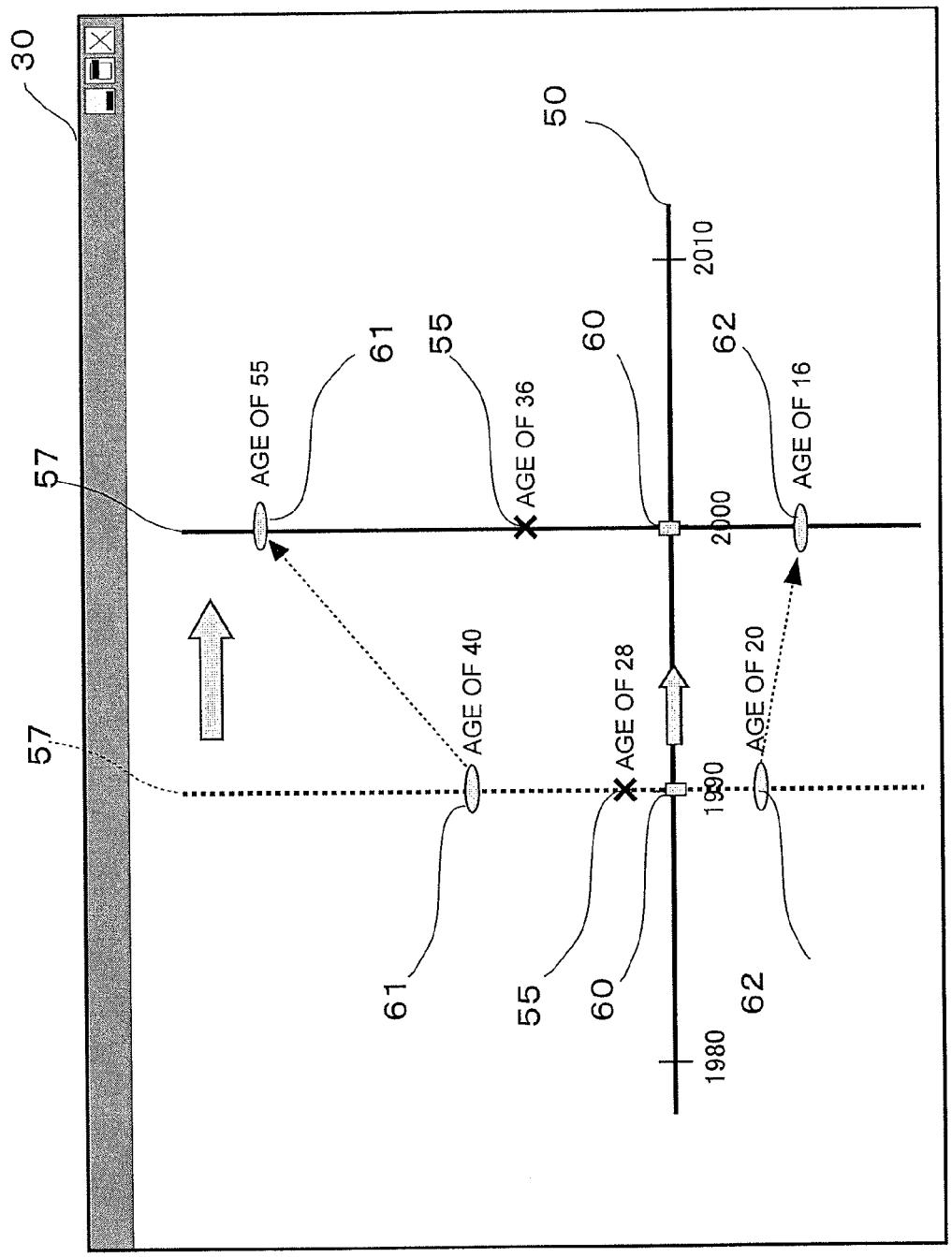
FIG. 13 is a schematic view illustrating a variant window screen displayed on the terminal of FIG. 1.

As illustrated in FIG. 13, when the user moves the scale bar 57 by the operation unit 24, the upper limit and the lower limit of the age may be indicated by the knobs 61, 62 according to the movement with more than or equal to a predetermined number of (such as zero or ten) search hits in the generation on which the scale bar 57 is positioned. At this time, the mark 55 "X" is indicated on the age indicating the maximum number of search hits in the generation indicated by the scale bar 57. In addition, the first item is a generation of the cell phone and the second item is an age when the cell phone is purchased, which are examples when being searched with reference to the search DB 12c and being displayed.

In addition, one item on a scale axis may be determined in step S5, and in the case of the item "price", for example, only the scale bar 51 is displayed and the information indicating the number of search hits is displayed in a graphical manner on the scale bar 51. For example, as illustrated in FIG. 7, the upper limit and the lower limit, which are searchable, are indicated by the knob 61 and the knob 62, and the maximum value is indicated by the mark 55 "X."

In addition, when making a search, the information processing server 10 may request an external search server to make a search via the network 3, and may acquire the number of search hits or the search results.

Further, the invention is by no means limited to the above embodiments. The above embodiment is an exemplary embodiment, employs substantially the same configuration as a technical idea disclosed in the scope of the claims of the invention, and any configuration is incorporated in a technical scope of the invention as long as the configuration provides the same function and effect.

EXPLANATION OF REFERENCE NUMERALS

3: NETWORK
10: INFORMATION PROCESSING SERVER (INFORMATION PROCESSING DEVICE)
12: MEMORY UNIT
12a: ITEM DB
12b: SCALE BAR DB
12c: SEARCH DB
14: SYSTEM CONTROL UNIT
20: TERMINAL
23: DISPLAY UNIT
24: OPERATION UNIT
26: SYSTEM CONTROL UNIT

The invention claimed is:

1. An information processing device, including at least one processor, comprising:
a search keyword acquiring unit, within said processor, that acquires search keywords from a terminal device;
an item setting unit, within said processor, that sets a first item and a second item displayable by scale axes in accordance with the search keywords;
a searching unit, within said processor, that makes a search by the search keywords;
a first display data generating unit, within said processor, that generates first display data for displaying a 2D distribution indicating more than or equal to a predetermined number of search hits by the searching on a Web page in accordance with the scale axis values of the items in a plane with two axes including the scale axis of the first item and the scale axis of the second item;
a transmitting unit, within said processor, that transmits the generated first display data to the terminal device;
a designated region acquiring unit, within said processor, that acquires information on a designated region designated by a user of the terminal device from the terminal device for the displayed 2D distribution;
a search result transmitting unit, within said processor, that transmits, to the terminal device, second display data as a list of search results for displaying search results by the search belonging to the designated region on the terminal device; and
a scale axis value acquiring unit, within said processor, that acquires the scale axis values of the first item and the second item in order to set three or more points in the plane, wherein the designated region acquiring unit acquires information on a designated region defined in the plane by the points set by the acquired scale axis values from the terminal device.

2. The information processing device according to claim 1, wherein the scale axis value acquiring unit moves on the scale axes by an operation of the user of the terminal device, and acquires the scale axis values of the first item and the second item from positions indicated by knobs designating the scale axis values.

3. An information processing method of processing information in an information processing device, comprising:
a search keyword acquiring step of acquiring search keywords from a terminal device;
an item setting step of setting a first item and a second item displayable by scale axes in accordance with the search keywords;
a searching step of making a search by the search keywords;
a first display data generating step of generating first display data for displaying a 2D distribution indicating more than or equal to a predetermined number of search hits by the searching on a Web page in accordance with the scale axis values of the items in a plane with two axes including the scale axis of the first item and the scale axis of the second item;
a transmitting step of transmitting the generated first display data to the terminal device;
a designated region acquiring step of acquiring information on a designated region designated by a user of the terminal device from the terminal device for the displayed 2D distribution;
a search result transmitting step of transmitting, to the terminal device, second display data as a list of search results for displaying search results by the search belonging to the designated region on the terminal device; and
a scale axis value acquiring step of acquiring the scale axis values of the first item and the second item in order to set three or more points in the plane, wherein in the designated region acquiring step, information on a designated region defined in the plane by the points set by the acquired scale axis values is acquired from the terminal device.

4. A non-transitory computer-readable recording medium recording an information processing program causing a computer to function as:
a search keyword acquiring unit that acquires search keywords from a terminal device;
an item setting unit that sets a first item and a second item displayable by scale axes in accordance with the search keywords;
a searching unit that makes a search by the search keywords;

a first display data generating unit that generates first display data for displaying a 2D distribution indicating more than or equal to a predetermined number of search hits by the searching on a Web page in accordance with the scale axis values of the items in a plane with two axes including the scale axis of the first item and the scale axis of the second item;

a transmitting unit that transmits the generated first display data to the terminal device;

a designated region acquiring unit that acquires information on a designated region designated by a user of the terminal device from the terminal device for the displayed 2D distribution;

a search result transmitting unit that transmits, to the terminal device, second display data as a list of search results for displaying search results by the search belonging to the designated region on the terminal device; and a scale axis value acquiring unit that acquires the scale axis values of the first item and the second item in order to set three or more points in the plane, wherein the designated region acquiring unit acquires information on a designated region defined in the plane by the points set by the acquired scale axis values from the terminal device.

* * * * *